United States Patent
Ihata et al.

(10) Patent No.: US 7,038,340 B2
(45) Date of Patent: May 2, 2006

(54) BEARING DEVICE AND AC GENERATOR FOR VEHICLES USING THE SAME

(75) Inventors: Koichi Ihata, Okazaki (JP); Shigenobu Nakamura, Anjo (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 11/034,768

(22) Filed: Jan. 14, 2005

(65) Prior Publication Data

US 2005/0168085 A1 Aug. 4, 2005

(30) Foreign Application Priority Data

Jan. 29, 2004 (JP) ............................ 2004-022126

(51) Int. Cl.
*H02K 5/16* (2006.01)
(52) U.S. Cl. ......................................... 310/90; 310/89
(58) Field of Classification Search ............ 310/89–91, 310/254, 258
See application file for complete search history.

(56) References Cited

U.S. PATENT DOCUMENTS 5,639,074 A * 6/1997 Greenhill et al. ........... 267/162
6,388,351 B1 * 5/2002 Fisher et al. ................... 310/91
6,486,580 B1 * 11/2002 Cenzer et al. ................. 310/90

FOREIGN PATENT DOCUMENTS

| JP | A-08-103049 | 4/1996 |
| JP | A-09-287620 | 11/1997 |
| JP | A-2000-087964 | 3/2000 |

* cited by examiner

*Primary Examiner*—Thanh Lam
(74) *Attorney, Agent, or Firm*—Oliff & Berridge PLC

(57) ABSTRACT

An AC generator for a vehicle includes front and rear bearings held by a housing, a stator disposed in the housing, a rotor having a rotation shaft rotatably supported by the front and rear bearings, and a multiple-helical wave washer disposed to apply a pre-load to at least one of outer rings of the front and rear bearings. The housing includes a front frame that has a front bearing box for holding the front bearing, and a rear frame that has a rear bearing box for holding the rear bearing, and the stator is disposed between the front frame and the rear frame. In addition, the multiple-helical wave washer can contact the outer ring of the rear bearing and a side wall of the rear bearing box. Accordingly, creep resistance of the rear bearing is improved within an allowable pre-load range.

16 Claims, 5 Drawing Sheets

BEARING DEVICE AND AC GENERATOR FOR VEHICLES USING THE SAME

CROSS REFERENCE TO RELATED APPLICATION

This application is based on Japanese Patent Application No. 2004-22126 filed on Jan. 29, 2004, the contents of which are incorporated herein by reference in its entirety.

FIELD OF THE INVENTION

The present invention relates to an AC generator (alternator) mounted on an engine of a vehicle such as a passenger car or a truck. More particularly, the present invention relates to a bearing device of a rotation shaft, which improves its vibration proof and restricts creep of a bearing.

BACKGROUND OF THE INVENTION

A single wave washer 1a shown in FIGS. 6A and 6B is used for a bearing device of a general electric motor as described in JP-A-9-287620, JP-A-8-103049 and JP-A-2000-87964, for example. In the general electric motor, an axial load due to vibration during rotation is small. However, a strong vibration is applied to a vehicle AC generator due to variation of a vehicle engine and variation due to a high speed rotation of the AC generator itself. Furthermore, when the AC generator has a large electrical generating capacity, the weight of its rotor increases and a creep force applied to a bearing of a rotation shaft of the AC generator also increases. In this case, a large creep resistance force is necessary for this AC generator.

If the single wave washer 1a is used for the vehicle AC generator, in order to have a large creep resistance, a pre-load of the single wave washer will exceed an allowable pre-load limit. As a result, the vehicle AC generator may be easily damaged. Therefore, it is difficult to satisfy both the large creep resistance and the allowable pre-load limit when a single wave washer is used.

SUMMARY OF THE INVENTION

In view of the above-described problems, it is an object of the present invention to provide an AC generator for vehicles, in which a suitable pre-load can be applied to a bearing for rotatably supporting a rotation shaft, so as to improve creep resistance performance and prevent an excessive pre-load without an increase in cost.

It is another object of the present invention to provide a bearing device for a rotation shaft, which improves creep resistance performance of a bearing without exceeding an allowable pre-load limit.

According to an aspect of the present invention, an AC generator for a vehicle includes a housing, first and second bearings held by the housing, a stator disposed in the housing, a rotor having a rotation shaft that is rotatably supported by the first and second bearings, and a multiple-helical wave washer disposed to apply a pre-load to at least one of outer rings of the first and second bearings. Because the multiple-helical wave washer is used, a suitable pre-load can be readily accurately obtained even when the AC generator is large. Accordingly, in the AC generator, a necessary creep resistance force can be maintained for a long time, while preventing troubles such as burning of bearing.

In one example, the housing includes a first frame that has a first bearing box for holding the first bearing, and a second frame that has a second bearing box for holding the second bearing. In this case, the stator is disposed between the first frame and the second frame, and the first bearing is disposed in the first bearing box with a clearance between the first bearing and a side wall of the first bearing box in an axial direction of the rotation shaft. Furthermore, the multiple-helical wave washer is disposed in the clearance, and contacts an outer ring of the first bearing and the side wall of the first bearing box.

Furthermore, the AC generator can be mountable in a vehicle so that the rotation shaft is disposed to extend in a vehicle front-rear direction, the first bearing is arranged to rotatably support a rear end portion of the rotation shaft, and the second bearing is arranged to rotatably support a front end portion of the rotation shaft. Generally, because the first bearing arranged at the rear end portion of the rotation shaft is small, the creep resistance performance of the first bearing and allowable stress of the washer can be easily satisfied by using a small multiple-helical wave washer.

Preferably, the side wall of the first bearing box is constructed with a side wall portion of the first frame made of aluminum and a washer box made of iron is disposed in the first bearing box and contacts an inner surface of the side wall portion of the first frame. Furthermore, the multiple-helical wave washer contacts the outer ring of the first bearing and the washer box. In this case, wear resistance of the AC generator can be improved.

The multiple-helical wave washer can include a plurality of wave-shaped rings arranged in an axial direction of the rotation shaft, and the wave-shaped rings are arranged such that crest portions of one wave-shaped ring contact trough portions of an adjacent wave-shaped ring. Therefore, even when a displacement amount of the multiple-helical wave washer becomes in maximum, the pre-load can be applied within the allowable pre-load range of the washer. For example, the multiple-helical wave washer can be formed from a single thin plate having two ends. In this case, the multiple-helical wave washer can be disposed in the clearance, and the two ends of the single thin plate do not contact the outer ring of the first bearing and do not contact the side wall of the first bearing box.

According to another aspect of the present invention, a bearing device includes first and second bearings for rotatably supporting a shaft at two end portions of the rotation shaft, first and second bearing housings for holding the first and second bearings, respectively, and a multiple-helical wave washer disposed to apply a pre-load to at least one of outer rings of the first and second bearings. Accordingly, the bearing device improves creep resistance performance of the bearing without exceeding an allowable pre-load limit. The bearing device can be suitably used for a rotor having a large weight.

BRIEF DESCRIPTION OF THE DRAWINGS

The above and other objects, features and advantages of the present invention will become more apparent from the following detailed description of exemplary embodiments made with reference to the accompanying drawings, in which.

DETAILED DESCRIPTION OF PREFERRED EMBODIMENTS (First Embodiment)

Figure 1:
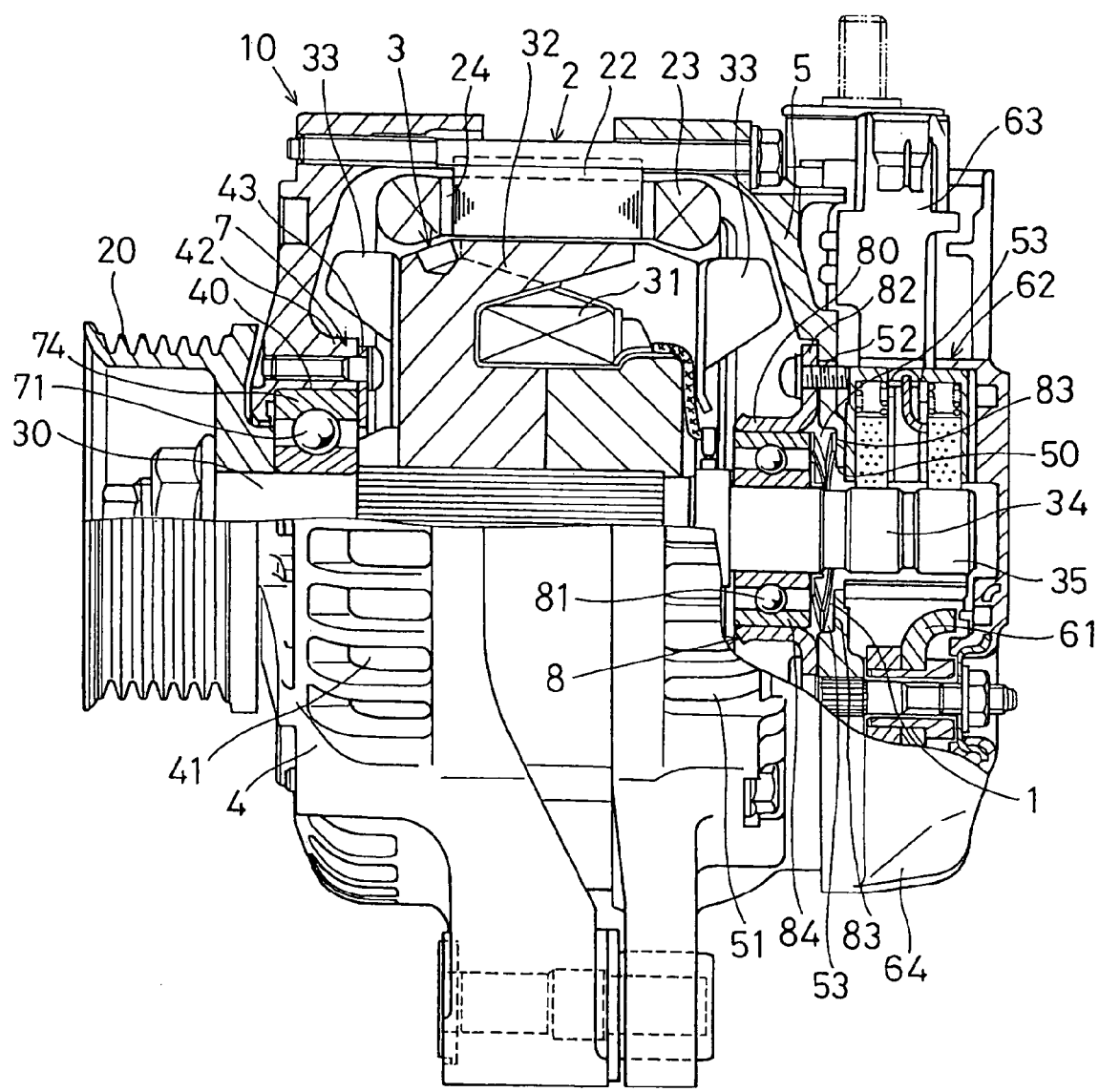
FIG. 1 is a partial cross-sectional view of an AC generator for vehicles according to a first preferred embodiment of the present invention.
Figure 2A:
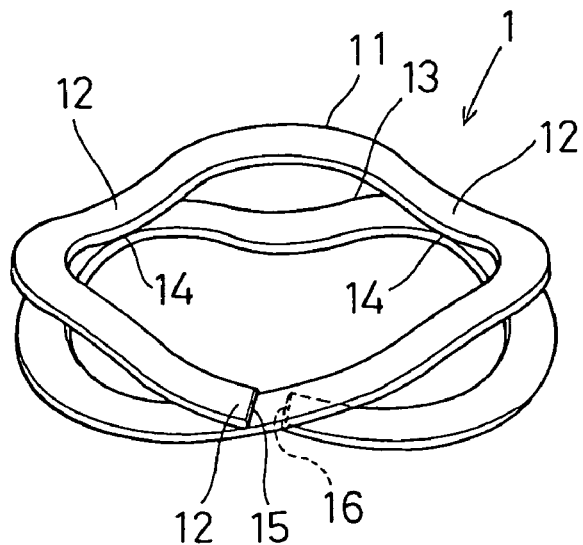
FIG. 2A is a perspective view showing a double-helical wave washer according to the first embodiment.
Figure 2B:
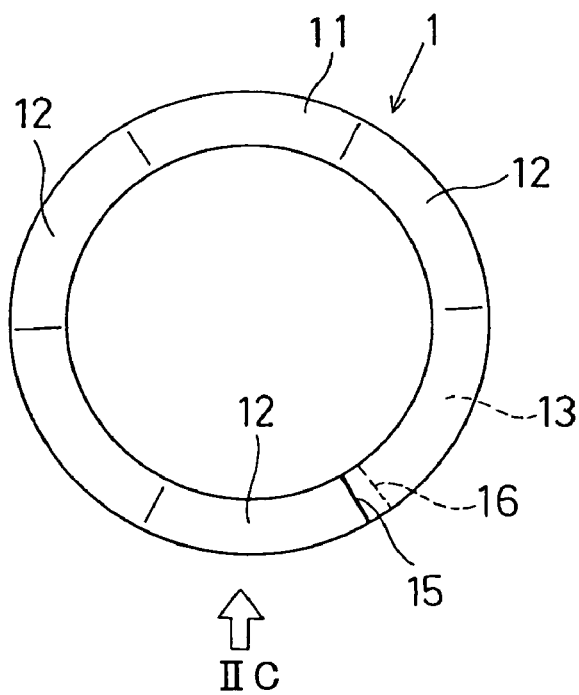
FIG. 2B is a plan view of the double-helical wave washer in FIG. 2A.
Figure 2C:
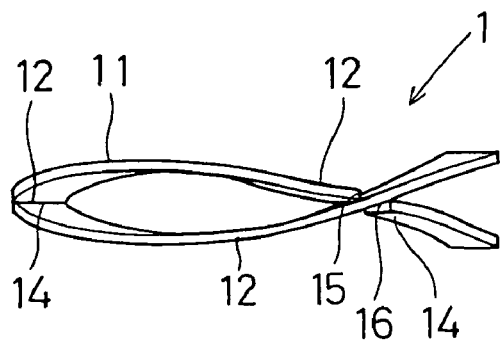
FIG. 2C is a side view of the double-helical wave washer when being viewed from IIC in FIG. 2B.

An AC generator 10 shown in FIG. 1 is an alternator that is driven by a vehicle engine through a belt to charge a battery mounted to the vehicle and to supply electrical power to various electrical equipment of the vehicle.

The AC generator 10 includes a stator 2, a rotor 3, and a pair of bowl-shaped frames, i.e., front frame 4 and rear frame 5. A commutator 61, a brush device 62 and a voltage regulator 63 are arranged at a rear outside of the rear frame 5 so as to convert three-phase alternating current to direct current. The commutator 61, the brush device 62 and the voltage regulator 63 are covered by a rear end cover 64 that is fastened to the rear frame 5.

The stator 2 includes a stator core 22, three-phase stator wirings 23 and an insulator 24 arranged between the stator core 22 and the stator wiring 23. The stator core 22 is inserted between an opening end portion of a peripheral wall portion of the front frame 4 and an opening end portion of a peripheral wall portion of the rear frame 5 so as to be inserted therebetween. The rotor 3 is disposed inside the stator 2 to have a predetermined clearance between the rotor 3 and the stator 2. The front frame 4 has a shaft hole 40 at a center area of its front side wall, and the rear frame 5 has a shaft hole 50 at a center area of its rear side wall. The front frame 4 and the rear frame 5 are connected with each other by using bolts, after the stator core 22 is inserted between the front frame 4 and the rear frame 5. Plural ventilation windows 41 for discharging air and drawing-in cool air are provided in the front frame 4. Similarly, plural ventilation windows 51 for discharging air and drawing-in cool air are provided in the rear frame 5.

A cylindrical front bearing box 7 is formed at the center area of the side wall portion of the front frame 4 and protrudes inwardly in an axial direction. Similarly, a cylindrical rear bearing box 8 is formed at the center area of the side wall portion of the rear frame 5 and protrudes inwardly in an axial direction. A front bearing 71 is disposed in the front bearing box 7 to rotatably support a front end portion of a rotation shaft 30, and a rear bearing 81 is disposed in the rear bearing box 8 to rotatably support a rear end portion of the rotation shaft 30. The front bearing box 7 includes a cylindrical portion 42 having therein the rotation shaft hole 40, and an engagement ring 43 is fastened to a rear end of the cylindrical portion 42.

The rear bearing box 8 is constructed with a cylindrical rear bearing holder 80 and a side wall surface 83 of the rear frame 5. The rear bearing holder 80 has a flange portion 82 that is fastened to a side wall of the rear frame 5 by using screws 52. In the rear bearing holder 80, the flange portion 82 extends radially outward from a rear end of a cylindrical portion. The side wall surface 83 is formed by countersinking the inside of the side wall portion of the rear frame 5 during molding of the rear frame 5. In this embodiment, the rear bearing holder 80 includes the cylindrical portion and the flange portion 82, and the side wall of the rear bearing box 8 is formed as a part of the side wall portion of the rear frame 5 made of an aluminum alloy.

The rotor 3 includes the rotation shaft 30 rotatably supported by the front bearing 71 and the rear bearing 81. A pulley 20 is provided at a front end portion of the rotation shaft 30, protruding from a front surface of the front frame 4. The pulley 20 is connected to the vehicle engine through a belt.

A magnetic field winding 31 is formed into a cylindrical shape by concentrically winding copper wire having thereon an insulating coat. The magnetic field winding 31 is disposed between two pole cores 32 to be inserted therebetween from two sides in the axial direction of the rotation shaft 30. Each of the pole cores 32 has plural claw portions (e.g., 6 claw portions in this embodiment). A cooling fan 33 is attached to each of front and rear end surfaces of the pole cores 32 by welding, for example. The cooling fans 33 draw the cooling air from front and rear sides and blow the drawn air in the axial direction and in a radial direction. Two spring rings 34 and 35 electrically connected to two ends of the magnetic field winding 31 are formed around a rear side end portion of the rotation shaft 30. Through the spring rings 34, 35, electrical power is supplied from the brush device 62 to the magnetic field winding 31.

The AC generator 10 is driven by the vehicle engine through the pulley 20 attached to the front end portion of the rotation shaft 30. When rotation force of the vehicle engine is transmitted to the pulley 20 through the belt, the rotor 3 rotates in a predetermined direction in the AC generator. In this state, when excitation voltage is applied to the magnetic field winding 31 of the rotor 3, the claw portions of the pole cores 32 are excited so as to generate three-phase AC voltage in the stator windings 23. Therefore, a predetermined DC voltage can be output from an output terminal of the commutator 61. The commutator 61 commutates the three-phase AC current generated by the stator winding 23 and converts the AC current to DC current.

Because the rotation shaft 30 of the rotor 3 is supported by the front bearing 71 and the rear bearing 81, a predetermined pre-load needs to be applied to the rotation shaft 30 in order to prevent a relative movement of the rotation shaft 30 in the axial direction. In this embodiment, an integrated double-helical wave washer 1 is inserted in a clearance 53 between the rear bearing 81 and the side wall surface 83 of the rear frame 5 to contact an outer ring 84 of the rear bearing 81 and the side wall surface 83. The double-helical wave washer 1 is formed into a double helical shape having waves in each helical circle.

According to the embodiment, the double-helical wave washer 1 is formed by bending approximately circularly a single thin plate-shaped spring material. In this embodiment, the double-helical wave washer 1 is bent circumferentially to form two concentric helical circles. The double-helical wave washer 1 includes a first ring portion 11 and a second ring portion 13. Each of the first ring portion 11 and the second ring portion 13 is wavy (has undulations) in the thickness direction of the thin plate-shaped spring plate to have plural crest portions and plural trough portions. The crest portions and the trough portions are alternately formed at a predetermined interval. The first ring portion 11 starts from a trough portion and ends at the same trough portion. The last end of the first ring portion 11 is continuous with the first end of the second ring portion 13. The second ring portion 13 starts from a crest portion 14, differently from the first ring portion 11. The wave periods of the first and second ring portions 11, 13 are the same. The first ring portion 11 and the second ring portion 13 are arranged such that the wave shape of the first ring portion 11 is offset from the wave shape of the second ring portion 13 by ½ cycle.

In the double-helical wave washer 1, the trough portions 12 of the first ring portion 11 contact the crest portions 14 of the second ring portion 13. Furthermore, an end 15 of the first ring portion 11 is positioned at a trough portion 12 of the first ring portion 11 so as to be spaced from one end surface of the double washer 1 in an axial direction of the washer 1. An end 16 of the second ring portion 13 is positioned at a crest portion 14 of the second ring portion 13 so as to be spaced from the other end surface of the double washer 1 in the axial direction of the washer 1. As a result, when the double-helical wave washer 1 is disposed in the clearance 53, both the ends 15, 16 do not contact either the outer ring 84 of the rear bearing 81 or the side wall surface 83 of the rear frame 5. Because the ends 15, 16 do not contact the side wall surface 83 made of aluminum alloy, it can prevent the pre-load from being decreased due to wear of the side wall surface 83.

In this embodiment, the double-helical wave washer 1 is used as a pre-load applying unit for applying a pre-load to the rear bearing 81. Accordingly, it can prevent the pre-load from being exceeded from an allowable pre-load range while improving creep-resistance performance, even when the weight of the rotor 3 increases.

Figure 4:
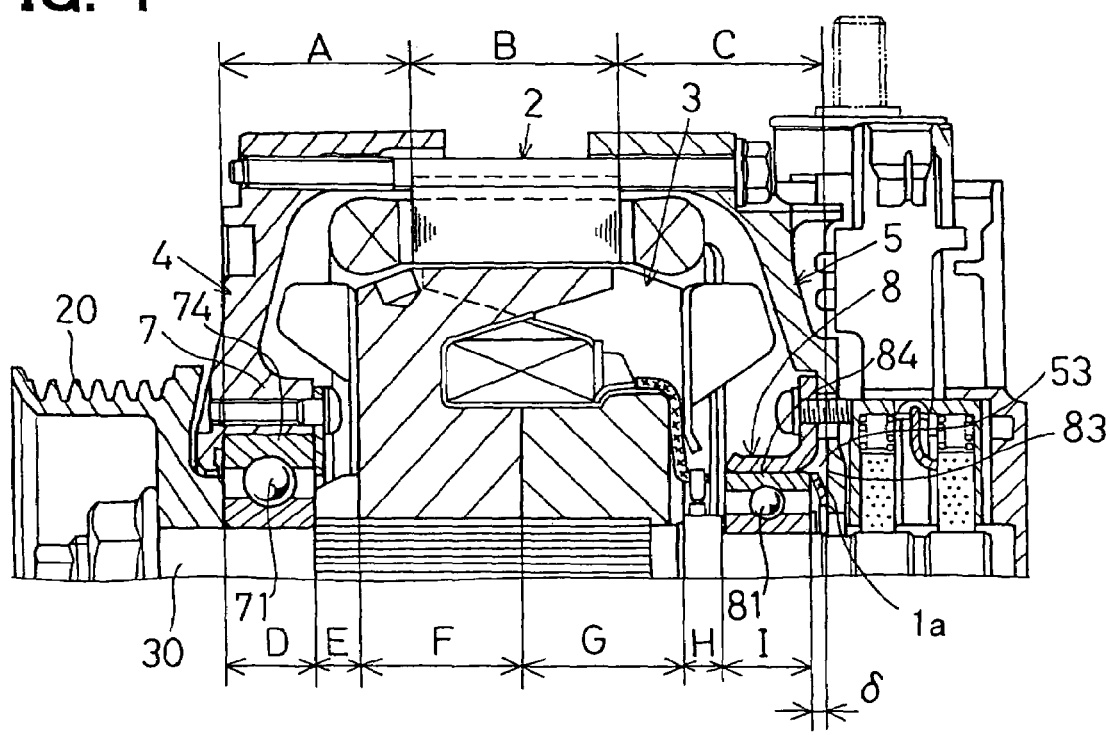
FIG. 4 is a partial cross-sectional view showing a part of an AC generator for vehicles in the comparison example.
Figure 6A:
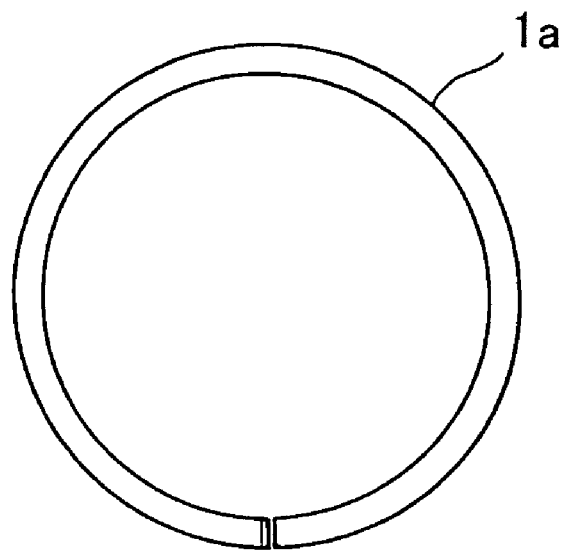
FIGS. 6A and 6B are a plan view and a side view showing a prior art single wave washer.
Figure 6B:
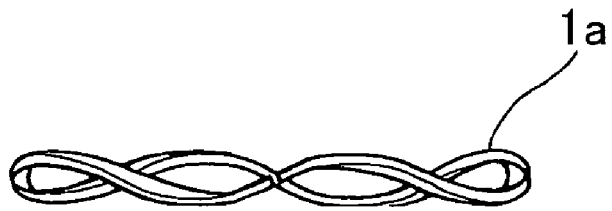

FIG. 4 shows an AC generator in a comparison example where the single-helical wave washer 1a shown in FIGS. 6A and 6B is disposed in the clearance 53 and is used as the pre-load applying unit. Generally, an axial dimension δ of the clearance 53 is set in consideration of dimension tolerances of axial dimensions A, B and C of components of a housing of the AC generator and axial dimensions D to I of components of the rotor 3. Therefore, the axial dimension δ of the clearance 53 may be greatly different depending on the AC generator, and the pre-load of the washer also greatly changes depending on the dimension tolerances of the components.

Figure 3:
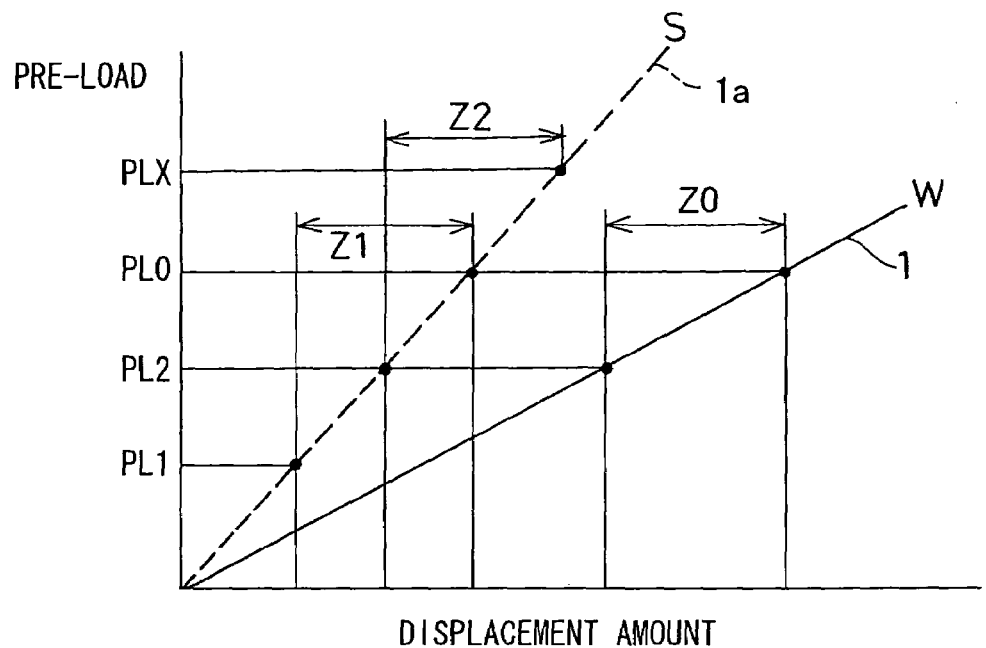
FIG. 3 is a graph showing wave washer characteristics in the first embodiment and a comparison example.

In FIG. 3, chain line S shows spring load characteristics when the single wave washer 1a is used, and solid line W shows spring load characteristics when the double-helical wave washer 1 is used. Furthermore, Z1 indicates a tolerance range of the axial dimension δ of the clearance 53 under a low variation and a light weight condition in a small capacity generator, and Z2 indicates a tolerance range of the axial dimension δ under a high variation and a large weight condition in a large capacity generator, when the single wave washer 1a is used. In addition, PL1 indicates a necessary pre-load in the low variation, PL2 indicates a necessary pre-load in the high variation, PL0 indicates an allowable pre-load limit, and PLX indicates an excessive pre-load value.

As shown in FIG. 3, when the single wave washer 1a is used for the small capacity generator, a necessary pre-load can be obtained so as to have a creep resistance property while it can prevent the pre-load from being increased more than the allowable pre-load limit. However, when the single wave washer 1a is used for the large capacity generator, even when the creep resistance performance is satisfied, the pre-load exceeds the allowable pre-load limit. In this case, the generator is easily damaged.

According to the first embodiment of the present invention, because the double-helical wave washer 1 is used, the necessary pre-load can be easily obtained without exceeding the allowable pre-load limit PL0. Further, when the washer 1 is formed into the double-helical wave shape, the washer 1 has a low spring constant and a large displacement amount compared with the single wave washer 1a. As a result, even when the tolerance Z0 of the axial dimension δ of the AC generator becomes larger, a suitable pre-load can be easily obtained, and a large creep resistance force can be maintained for a long time.

Because the double-helical wave washer 1 is formed from a single thin plate to have a double helical wave shape having the two rings 11 and 13, the washer 1 can be easily manufactured at a low cost. Furthermore, the double-helical wave washer 1 is arranged in the clearance 53 between the side wall surface 83 of the rear bearing box 8 and the outer ring 84 of the rear bearing 81. Generally, the front bearing 71 on the side of the pulley 20 has a large size and is fixed to the front frame 4. In contrast, the rear bearing 81 on the rear side opposite to the front bearing 71 in the axial direction has a small size and is fixed to the rear frame 5. Accordingly, by inserting the double-helical wave washer 1 having a small size in the clearance 53, the creep resistance performance of the rear bearing 81 can be obtained within an allowable stress range.

In the first embodiment, the AC generator 10 is mounted in the vehicle such that the rotation shaft 30 extends in a vehicle front-rear direction. However, the mounting direction of the AC generator 10 in the vehicle can be suitably changed.

(Second Embodiment)

Figure 5:
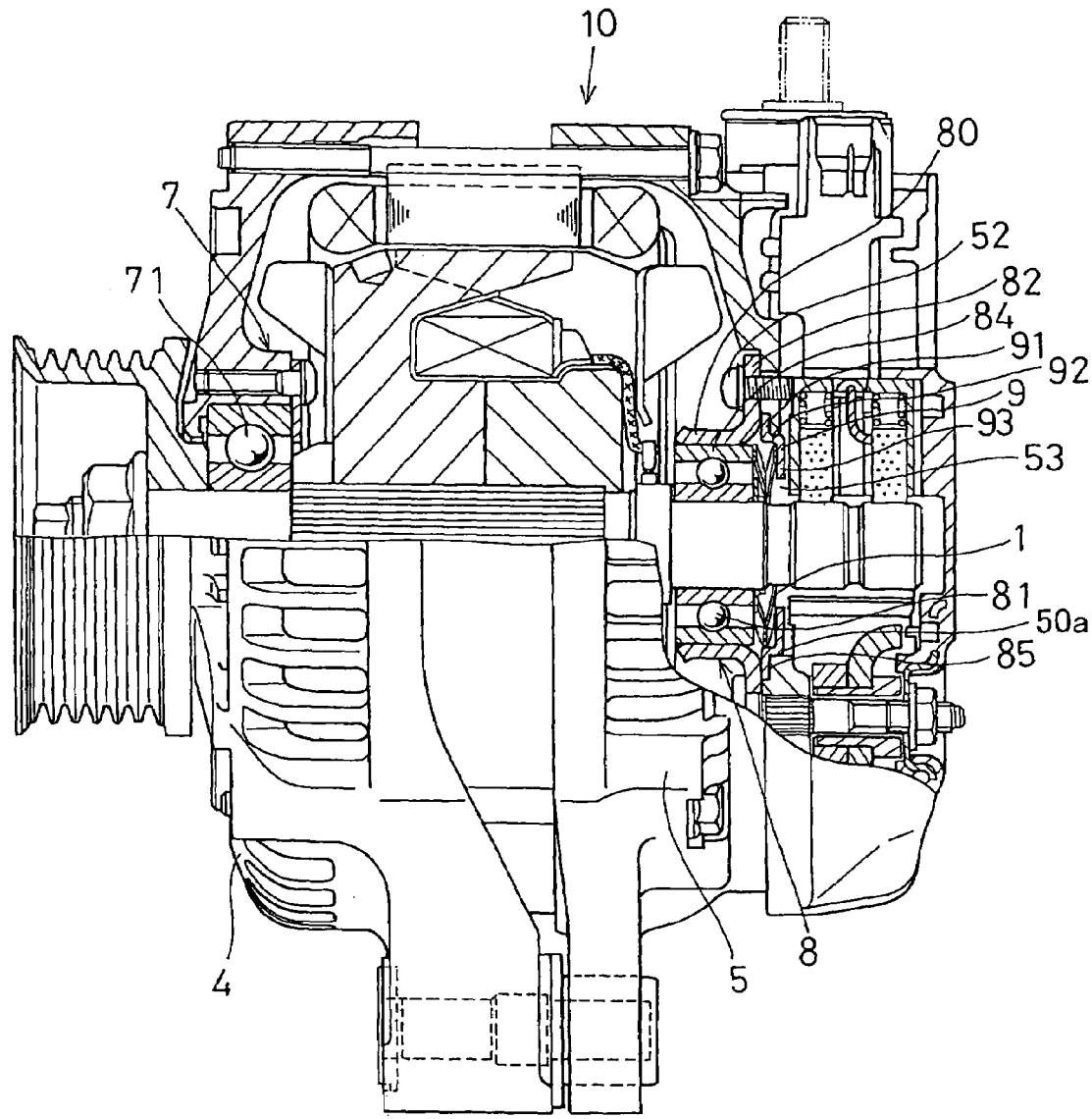
FIG. 5 is a partial cross-sectional view showing an AC generator for vehicles according to a second preferred embodiment of the present invention.

A second embodiment of the present invention will be now described with reference to FIG. 5. In the second embodiment, the side wall surface 83 of the rear frame 5 described in the first embodiment is removed to form an enlarged shaft hole 50a that is enlarged radially outward compared with the rotation shaft hole 50 of the first embodiment. A washer box 9 made of iron is inserted in the enlarged shaft hole 50a. The washer box 9 includes a cylindrical portion 92 arranged in the rotation shaft hole 50a to extend in the axial direction, an outside flange portion 91 extending radially outward from a front end of the cylindrical portion 92, and an inside flange portion 93 extending radially inward from a rear end of the cylindrical portion 92. Accordingly, in the second embodiment, the double-helical wave washer 1 contacts the inside flange portion 93 of the washer box 9. That is, the inside flange portion 93 is disposed to form the side wall of the rear bearing box 8.

The double-helical wave washer 1 described in the first embodiment is inserted in a clearance 53 between the outer ring 84 of the rear bearing 81 and the inside flange portion 93 to contact the outer ring 84 of the rear bearing 81 and an inner wall surface of the inside flange portion 93. The outside flange portion 91 is inserted between the flange portion 82 of the rear bearing holder 80 and a facing surface 85 that is provided in the side wall portion of the rear frame 5 around the rotation shaft hole 50a, so that the washer box 9 is fixed. Accordingly, in the second embodiment, the double-helical wave washer 1 is inserted between the outer ring 84 and the washer box 9 to contact the outer ring 84 and the washer box 9.

According to the second embodiment, because the washer box 9 separated from the rear frame 5 is used, the axial dimension of the clearance 53 can be set larger, and the double-helical wave washer 1 can be more easily arranged in the clearance 53. Further, because the double-helical wave washer 1 is arranged to contact the inside flange portion 93 of the washer box 9 made of iron, wear resistance is increased in the contact surface of the flange portion 93, and durability of the AC alternator 10 can be improved. In addition, because the washer box 9 is fixed while the rear bearing holder 80 is fastened to the rear frame 5, the washer box 9 can be easily attached.

(Other Embodiments)

Although the present invention has been described in connection with some preferred embodiments thereof with reference to the accompanying drawings, it is to be noted that various changes and modifications will become apparent to those skilled in the art.

For example, in the above-described first and second embodiments, the double-helical wave washer 1 is used as the pre-load applying unit. However, a multiple-helical wave washer having more than two helical layers can be used as the pre-load applying unit. In this case, the creep resistance performance can be further improved while having a large washer allowable stress. Accordingly, the multiple-helical wave washer can be easily used for the front bearing 71 at the side of the pulley 20. (In this case, the washer could contact the outer ring 74 of the front bearing 71.) The multiple-helical wave washer can have more than two helical rings. That is, the multiple-helical wave washer can be constructed with a plurality of wave-shaped rings arranged in the axial direction of the rotation shaft 30. Furthermore, adjacent wave-shaped rings can be arranged such that crest portions of one wave-shaped ring contact trough portions of the adjacent wave-shaped ring.

In the above-described first and second embodiments, the multiple-helical wave washer (e.g., double-helical wave washer 1) is used only for the bearing device at the rear end side of the rotation shaft 30. However, the multiple-helical wave washer can be used for both of the bearing devices provided at two end sides of the rotation shaft 30.

Furthermore, even in the above-described first embodiment, a washer box made of iron can be arranged inside the side wall portion of the rear frame 5 made of aluminum to contact the multiple-helical wave washer 1. In this case, the washer box integrated with the rear frame 5 forms a part of the rear box 8.

In addition, in the above-described embodiments, the double-helical wave washer 1 (multiple-helical wave washer) is formed from a single thin plate. However, a multiple-helical wave washer can be formed by bonding plural single wave washers together in a multiple-helical shape.

Furthermore, in the above-described embodiment, the bearing device is applied to an AC generator (alternator) for vehicles. However, the bearing device of the present invention can be used in other environments, and is not limited to use in an AC generator.

While the invention has been described with reference to exemplary embodiments thereof, it is to be understood that the invention is not limited to the exemplary embodiments and constructions. The invention is intended to cover various modification and equivalent arrangements. In addition, while the various elements of the exemplary embodiments are shown in various combinations and configurations, which are exemplary, other combinations and configuration, including more, less or only a single element, are also within the spirit and scope of the invention.

What is claimed is:

1. An AC generator for a vehicle, comprising:
   a housing;
   first and second bearings held by the housing;
   a stator disposed in the housing;
   a rotor operatively coupled to the stator, and having a rotation shaft that is rotatably supported by the first and second bearings; and
   a multiple-helical wave washer disposed to apply a pre-load to at least one of outer rings of the first and second bearings;
   the housing includes a first frame that has a first bearing box for holding the first bearing, and a second frame that has a second bearing box for holding the second bearing;
   the stator is disposed between the first frame and the second frame;
   the first bearing is disposed in the first bearing box with a clearance between the first bearing and a side wall of the first bearing box in an axial direction of the rotation shaft;
   the side wall of the first bearing box is constructed with a side wall portion of the first frame and is made of aluminum, and a washer box made of iron is disposed in the first bearing box and contacts an inner surface of the side wall portion of the first frame; and
   the multiple-helical wave washer is disposed in the clearance, and contacts an outer ring of the first bearing and the washer box.

2. The AC generator according to claim 1, wherein the AC generator is mountable in a vehicle so that the rotation shaft is disposed to extend in a vehicle front-rear direction;
   the first bearing is arranged to rotatably support a rear end portion of the rotation shaft; and
   the second bearing is arranged to rotatably support a front end portion of the rotation shaft.

3. The AC generator according to claim 1, wherein:
   the first bearing box includes a bearing holder that has a cylindrical portion extending in the axial direction and a flange extending radially outward from an axial end of the cylindrical portion;
   the flange of the bearing holder is fastened to the side wall portion of the first frame;
   the washer box includes a cylindrical portion, an outer flange portion extending radially outward from one axial end of the cylindrical portion, and an inner flange portion extending radially inward from the other axial end of the cylindrical portion; and
   the outer flange portion of the washer box is disposed between the flange of the bearing holder and the side wall portion of the first frame in the axial direction.

4. The AC generator according to claim 1, wherein:
   the multiple-helical wave washer includes a plurality of wave-shaped rings arranged in an axial direction of the rotation shaft; and
   the wave-shaped rings are arranged such that crest portions of one wave-shaped ring contact trough portions of an adjacent wave-shaped ring.

5. The AC generator according to claim 1, wherein the multiple-helical wave washer is formed from a single thin plate having two ends.

6. The AC generator according to claim 5, wherein the multiple-helical wave washer is disposed in the clearance, and the two ends of the single thin plate do not contact the outer ring of the first bearing and do not contact the washer box.

7. The AC generator according to claim 1, wherein the multiple-helical wave washer is a double-helical wave washer having two concentric rings.

8. The AC generator according to claim 1, further comprising
   a pulley couplable to an engine of a vehicle, wherein the pulley is disposed adjacent to one end of the rotation shaft adjacent to the second bearing.

9. The AC generator according to claim 1, wherein the first and second bearings are arranged at two end portions of the rotation shaft in an axial direction of the shaft to rotatably support the two end portions of the rotation shaft.

10. A bearing device comprising:
first and second bearings for rotatably supporting a shaft at two end portions of the shaft;
first and second bearing housings for holding the first and second bearings, respectively; and
a multiple-helical wave washer disposed to apply a preload to at least one of outer rings of the first and second bearings;
the first bearing housing includes a bearing holder that has a cylindrical portion and a flange extending radially outward from an axial end of the cylindrical portion, and a washer holder;
the flange of the bearing holder is connected to an outer peripheral portion of the washer holder; and
the multiple-helical wave washer contacts an outer ring of the first bearing and the washer holder.

11. The bearing device according to claim 10, wherein:
the first bearing is disposed in the first bearing housing with a clearance between the first bearing and the washer holder in an axial direction of the shaft; and
the multiple-helical wave washer is disposed in the clearance and contacts the outer ring of the first bearing and the washer holder.

12. The bearing device according claim 10, wherein:
the washer holder includes a cylindrical portion, an outer flange portion extending radially outward from one axial end of the cylindrical portion, an inner flange portion extending radially inward from the other axial end of the cylindrical portion;
the outer flange portion of the washer holder is connected to the flange of the bearing holder; and
the multiple-helical wave washer contacts the outer ring of the first bearing and the inner flange portion of the washer holder.

13. The bearing device according to claim 10, wherein:
the multiple-helical wave washer includes a plurality of wave-shaped rings arranged in an axial direction of the shaft; and
the wave-shaped rings are arranged such that crest portions of one wave-shaped ring contact trough portions of an adjacent wave-shaped ring.

14. The bearing device according to claim 11, wherein the multiple-helical wave washer is formed from a single thin plate having two ends.

15. The bearing device according to claim 14, wherein the multiple-helical wave washer is disposed in the clearance, and the two ends of the single thin plate do not contact the outer ring of the first bearing and do not contact the washer holder.

16. The bearing device according to claim 10, wherein the multiple-helical wave washer is a double-helical wave washer.

* * * * *